(12) United States Patent
Hao et al.

(10) Patent No.: US 10,218,901 B2
(45) Date of Patent: Feb. 26, 2019

(54) PICTURE COMPOSITION ADJUSTMENT

(71) Applicant: INTERNATIONAL BUSINESS MACHINES CORPORATION, Armonk, NY (US)

(72) Inventors: Ruo Meng Hao, Shanghai (CN); Xiang Yu Song, Shanghai (CN); Ning Wang, Shanghai (CN); You Miao Zhang, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/480,150

(22) Filed: Apr. 5, 2017

(65) Prior Publication Data

US 2018/0295281 A1    Oct. 11, 2018

(51) Int. Cl.
*H04N 5/232* (2006.01)
*G06T 7/60* (2017.01)
*G06T 7/70* (2017.01)

(52) U.S. Cl.
CPC ........... *H04N 5/23222* (2013.01); *G06T 7/60* (2013.01); *G06T 7/70* (2017.01)

(58) Field of Classification Search
CPC .......... H04N 5/23222; G06T 7/70; G06T 7/60
See application file for complete search history.

(56) References Cited

U.S. PATENT DOCUMENTS

| | | | |
|---|---|---|---|
| 8,508,622 B1 | 8/2013 | Anon | |
| 8,659,667 B2 | 2/2014 | Syed et al. | |
| 8,704,929 B2 * | 4/2014 | Imai | H04N 5/23222 348/207.99 |
| 9,204,054 B2 | 12/2015 | Aoki | |
| 2006/0158534 A1 * | 7/2006 | Gotohda | H04N 5/232 348/239 |
| 2008/0239104 A1 * | 10/2008 | Koh | G06K 9/00221 348/240.99 |
| 2008/0273097 A1 * | 11/2008 | Nagashima | G06K 9/3241 348/231.99 |
| 2009/0102940 A1 * | 4/2009 | Uchida | G06K 9/00664 348/222.1 |
| 2009/0208135 A1 * | 8/2009 | Endo | H04N 5/23219 382/284 |

(Continued)

FOREIGN PATENT DOCUMENTS

CN    104182970 A1    12/2014

OTHER PUBLICATIONS

Ma et al., "Finding Your Spot: A Photography Suggestion System for Placing Human in the Scene," IEEE International Conference on Image Processing (ICIP), Oct. 27-30, 2014 (2 pages).

(Continued)

*Primary Examiner* — Shahbaz Nazrul
(74) *Attorney, Agent, or Firm* — Griffiths & Seaton PLLC

(57) ABSTRACT

Embodiments of the present disclosure allow user experience of photographing to be improved. In operation, it is determined whether a picture composition of a first object and a second object needs to be adjusted based on a predefined composition rule. If the picture composition needs to be adjusted, an adjusting pattern is determined based on the predefined composition rule. Then, the adjusting pattern is provided to a user to indicate the user to adjust the picture composition based on thereon.

18 Claims, 5 Drawing Sheets

(56) References Cited

U.S. PATENT DOCUMENTS

| | | | | |
|---|---|---|---|---|
| 2009/0268943 A1* | 10/2009 | Yoshizumi | ......... | H04N 5/23222 382/103 |
| 2009/0278958 A1* | 11/2009 | Bregman-Amitai | ......................... | H04N 5/23219 348/231.99 |
| 2010/0074613 A1 | 3/2010 | Masuno et al. | | |
| 2010/0110266 A1* | 5/2010 | Lee | .................... | H04N 5/23219 348/333.02 |
| 2010/0231741 A1* | 9/2010 | Suzuki | ............... | G06K 9/00255 348/222.1 |
| 2010/0290673 A1* | 11/2010 | Miyashita | .......... | G06K 9/00664 382/103 |
| 2010/0290705 A1* | 11/2010 | Nakamura | .............. | G06T 11/60 382/173 |
| 2011/0090390 A1* | 4/2011 | Narita | ................ | H04N 5/23219 348/333.03 |
| 2012/0062768 A1* | 3/2012 | Arai | ...................... | G06T 3/0012 348/239 |
| 2013/0235086 A1* | 9/2013 | Otake | ................. | H04N 5/23293 345/660 |
| 2013/0258159 A1* | 10/2013 | Sakane | .............. | H04N 5/23293 348/333.02 |
| 2014/0232920 A1* | 8/2014 | Kim | ................... | H04N 5/23219 348/333.02 |
| 2014/0368718 A1* | 12/2014 | Matsutani | .......... | H04N 5/23293 348/333.02 |
| 2015/0055887 A1* | 2/2015 | Hasegawa | ............... | G06T 11/00 382/284 |
| 2017/0374246 A1* | 12/2017 | Wang | ................. | H04N 5/23222 |
| 2018/0041692 A1* | 2/2018 | Qin | .................... | H04N 5/23216 |

OTHER PUBLICATIONS

Kakimori et al., "A System to Help Amateurs Take Pictures of Delicious Looking Food," IEEE Second International Conference on Multimedia Big Data (BigMM), Apr. 20-22, 2016 (2 pages).

* cited by examiner

PICTURE COMPOSITION ADJUSTMENT

BACKGROUND

The present invention relates generally to a photographic method, and more specifically, to a system, method, and computer program product used for picture composition adjustment.

When a person wants to take a picture with a certain scenery, he or she usually asks another person, for example, a passenger for assistance. In some cases, the composition of the picture taken by the passenger is unsatisfactory due to individual difference in photography skills, for example, the person in the picture is too small or too big, the person overlapping with the scenery, the scenery being fragmented, and/or the like. As such, the person has to spend a lot of time or effort to delete the unsatisfactory picture. As a result, good mementos of the scenery are lost and time/effort is wasted.

SUMMARY

In one aspect, a computer-implemented method is proposed. According to the method, it is determined whether a picture composition of a first object and a second object needs to be adjusted based on a predefined composition rule. If so, an adjusting pattern is determined based on the predefined composition rule. Then, the adjusting pattern is provided to a user to indicate the user to adjust the picture composition based on thereon.

In another aspect, a device is proposed. The device includes one or more processors and a memory coupled to at least one of the processors. A set of computer program instructions are stored in the memory and executed by at least one of the processors in order to perform actions. The actions include determining, based on a predefined composition rule, whether a picture composition of a first object and a second object needs to be adjusted; in response to determining that the picture composition needs to be adjusted, determining an adjusting pattern based on the predefined composition rule; and providing the adjusting pattern to a user, to indicate the user to adjust the picture composition based on the adjusting pattern.

In yet another embodiment, a computer program product is proposed. The computer program product is tangibly stored on a non-transient machine readable medium and comprising executable instructions which, when executed on a device, cause the device to determine, based on a predefined composition rule, whether a picture composition of a first object and a second object needs to be adjusted; in response to determining that the picture composition needs to be adjusted, determine an adjusting pattern based on the predefined composition rule; and provide the adjusting pattern to a user, to indicate the user to adjust the picture composition based on the adjusting pattern.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as opened terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
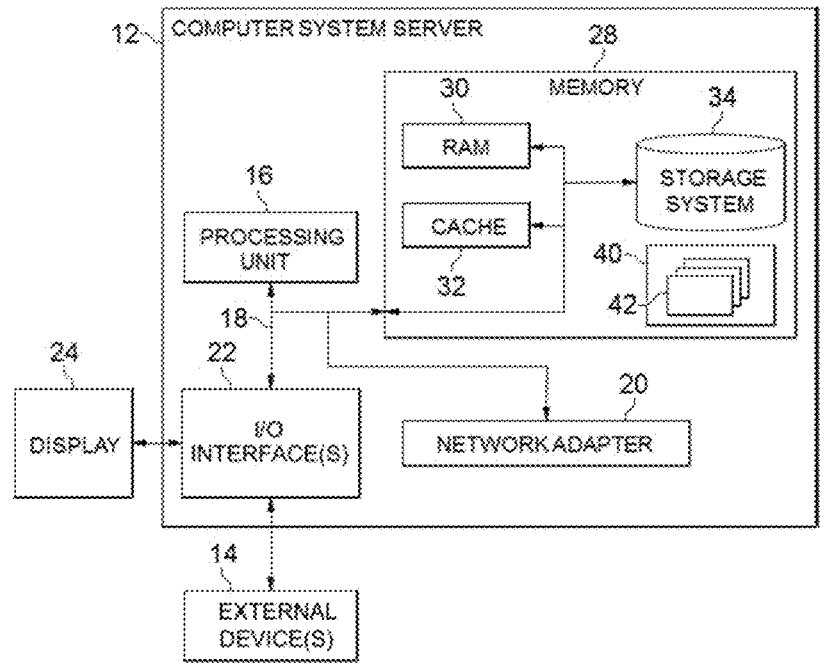
FIG. 1 is a block diagram of a device in which embodiments of the present disclosure can be implemented.

Reference is first made to FIG. 1, in which an exemplary device, referred to as computer system/server 12, which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such as keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

It is to be noted that the computer system/server 12 may be implemented as any suitable computing device, including but not limited to, a personal computer, a workstation, a mainframe, a midrange computer, a network appliance, a palm top computer, a telephony device, a blade computer, a hand held computer, and the like.

It is to be understood that the computer system/server 12 may also communicate with other external devices, such as a camera for capturing pictures, such as images, photographs, and the like. A user can use the computer system/server 12 to take pictures via the camera. It is also to be understood that the camera discussed in the present disclosure does not limited to a specific camera, but any suitable instrument capable of capturing pictures.

The device in which embodiments of the present disclosure can be implemented may be implemented by the computer system/server 12 as illustrated in FIG. 1. Examples of the device may include, but not limited to, mobile phones, tablets, laptops, video cameras, digital cameras, or any other suitable computing system/device, either known at present or to be developed in the future. It is to be understood that the above device is described merely for the purpose of illustration, without suggesting any limitation as to the scope of the disclosure. Those skilled in the art will appreciate that various other implementations of the device are contemplated.

Now some example embodiments of the present disclosure will be described. Conventionally, when a person asks another one (also referred to as a photographer or a user hereafter) to take a picture for him or her together with scenery, the composition of the picture (also referred to as the "picture composition" hereafter) may be unsatisfactory. As such, the person may have poor experience in this regard. In order to address this and other potential problem, embodiments of the present disclosure provide a picture composition adjustment solution.

Specifically, the device as discussed with respect to embodiments of the present disclosure determines whether a composition of a picture (also referred to as the "picture composition" hereafter) to be taken by the user needs to be adjusted based on a predefined composition rule. The predefined composition rule defines a requirement for a good picture composition based on, for example, photography, composition theories, preferences of the photographed person, and/or the like. If the device decides that the picture composition needs to be adjusted, the device determines an adjusting pattern based on the predefined composition rule, and then provides the adjusting pattern to the user to indicate the user to adjust the picture composition based on the adjusting pattern. As such, the adjusted picture composition can better meet the predefined composition rule. As a result, the picture composition can be improved. In this way, it is possible to meet the photographed person's personalized demands, thereby improving the user experience.

Figure 2:
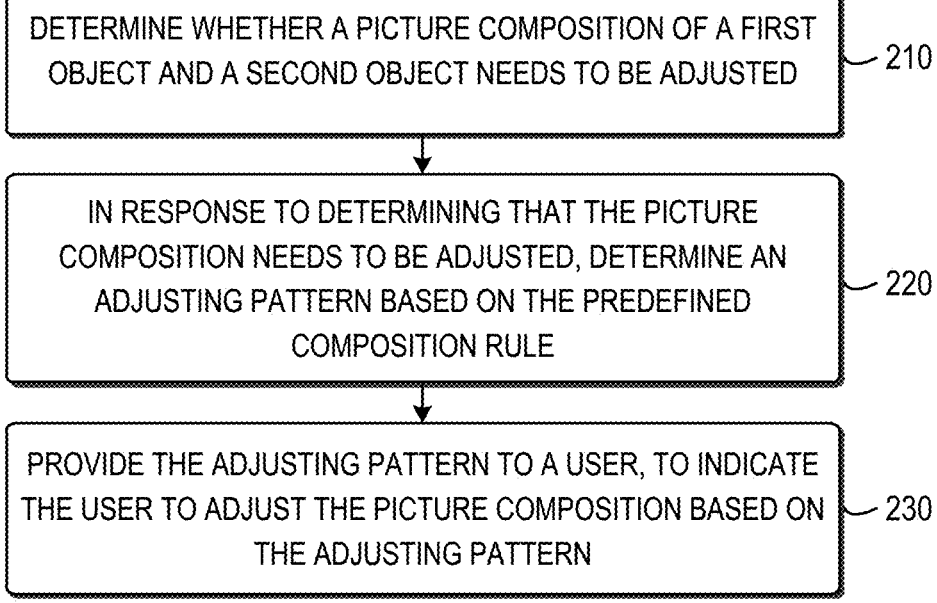
FIG. 2 is a flow chart of a method for adjusting a picture composition in accordance with embodiments of the present disclosure.

FIG. 2 illustrates a method 200 for adjusting a picture composition in accordance with embodiments of the present disclosure. The method 200 may be at least in part implemented by the device as discussed above, for example.

The method 200 is entered at 210, where it is determined based on a predefined composition rule whether a picture composition of a first object and a second object needs to be adjusted. The picture composition of a first object and a second object refers to the composition of a picture to be taken to include both the first object and the second object. The first object may be, for example, but not limited to, a scenery, a certain person, a building, a landmark, a famous mountain, a tree, a lake, a waterfall, and/or any other suitable object that is possibly interesting. The first object may be predetermined by, for example, but not limited to, the photographed person, the user taking the picture, or any other suitable user.

There may be several ways to predetermine the first object. In an embodiment, the first object may be selected by the photographed person or the user manually on a viewfinder of the device. The viewfinder may be, for example, a Liquid Crystal Display (LCD), a touch screen, and/or the like. In an embodiment, the photographed person or the user may directly perform the selection via finger touches on the touch screen. In an alternative embodiment, the photographed person or the user may enter the name of the first object via a text input box or a microphone. Then, the device may determine the first object based on text or speech recognition techniques.

It is to be understood that the above examples for predetermining the first object are described merely for the purpose of illustration, without suggesting any limitation as to the scope of the disclosure. Those skilled in the art may predetermine the first object in many other suitable ways. By way of example, the photographed person may tell the user (i.e., the photographer) what is the first object, and then the user can select the first object on the viewfinder. In another example, the first object may be automatically recognized by the device from the viewfinder, without the need of user selection.

According to embodiments of the present disclosure, the second object may include one or more persons to be photographed, for example, the person(s) that want to take a picture with the first object. It is to be understood that this is just an example, rather than suggesting any limitation. In some other embodiments, the second object may be implemented as a scenery different from the first object, animal(s), and/or other suitable object(s).

The predefined composition rule defines a requirement for a good picture composition based on photography, theory of picture composition, preferences of the person to be photographed, and/or the like. In accordance with embodiments of the present disclosure, the predefined composition rule may be implemented in a variety of ways, and may include various predefined position requirements, predefined relationship requirements, matching criteria, thresholds, and/or the like. The predefined composition rule may be associated with a position relationship of the first object and the second object. In embodiments of the present disclosure, the composition of a picture or the picture composition includes organization, coordination, and/or arrangement of objects to be taken a picture.

In some embodiments, the predefined composition rule may define that a composition ratio of a height and a width of the picture composition should match a first ratio of a height and a width of a region including the first object and the second object. The region may be, for example, a rectangular, that covers the main body of the first object and the second object. The first ratio may be calculated based on the height and the width of the rectangular. The composition ratio may be calculated based on the height and the width of the picture composition, for example, the height and the width of the screen of the device or a portion of the screen that is used for taking the picture. The device may determine whether the composition ratio matches the first ratio based on the predefined composition rule. In an embodiment, if the width of the region is larger than the height of the region, the width of the picture composition should be larger than the height of the picture composition. Otherwise, the device may determine that the composition ratio mismatches the first ratio, and may further determine that the picture composition needs to be adjusted at 210. More details in this regard will be discussed with reference to embodiments of FIG. 3 below.

Alternatively or in addition, in some embodiments, the predefined composition rule may define that a total width of the picture composition and a second width of the second object should meet a predefined relationship requirement. The total width of the picture composition may be determined as the width of the screen of the device or the width of a portion of the screen that is used for taking the picture. The second width may be the width of a region, for example, a rectangular that covers the second object or covers the main body of the second object. For example, assuming that the second object includes a plurality of persons (denoting the number of the persons as n), the width of the second object in the picture should meet a requirement, such as within a range of n/(n+4) to n/(n+2) of the whole picture. In this case, at 210, the device may determine whether the total width and the second width meet this requirement. If not, the device may determine that the picture composition needs to be adjusted. More details in this regard will be discussed with reference to embodiments of FIG. 4 below.

Alternatively or in addition, in some embodiments, the predefined composition rule may define that the first object and the second object should not overlap with each other unless a certain requirement is met, for example, a ratio of areas of a first region of the first object and a total region of the picture composition is less than a ratio threshold. The ratio of the first region and the total region may be calculated based on the areas of the two regions. The ratio threshold may be predetermined based on system requirements, historical values, photography theories, and so on. By way of example, if the first object is more than ⅔ of the whole picture, the second object is allowed to cover the first object. In such embodiments, at 210, the device may first determine whether the first object overlaps with the second object. If so, the device may further determine whether the ratio of the first region of the first object and the total region of the picture composition is less than a ratio threshold. If the ratio is less than the ratio threshold, the device may determine that the picture composition needs to be adjusted. More details in this regard will be discussed with reference to embodiments of FIG. 5 below.

Alternatively or in addition, in some embodiments, the predefined composition rule may define that a first center of the first object and a second center of the second object should meet a predefined position requirement. In an embodiment, if the picture composition is divided as nine rectangle grids, the second center of the second object, for example, the head of a person to be photographed, should be in proximity of any of four focuses of the nine-rectangle-grid. In addition or alternatively, if the picture composition or the screen of the device is divided into two parts, the first center and the second center should in the same part. In such cases, at 210, the device may determine whether the first center and the second center meet a predefined position requirement. If not, the device may determine that picture composition needs to be adjusted. More details in this regard will be discussed with reference to embodiments of FIG. 6 below.

It is to be understood that the above examples of the predefined composition rule are described merely for the purpose of illustration, without suggesting any limitation as to the scope of the disclosure. Those skilled in the art would appreciate that there may other suitable ways to define the composition rules and use them to evaluate the picture composition.

At 220, in response to determining that the picture composition needs to be adjusted, an adjusting pattern is determined based on the predefined composition rule.

In some embodiments, if the device determines that the composition ratio mismatches the first ratio and thus determines at 210 that the picture composition needs to be adjusted, the device may determine at 220 the adjusting pattern as rotating the camera to enable the composition ratio matches the first ratio.

Alternatively or in addition, in some embodiments, if the device determines, at 210, that the total width and the second width fail to meet the predefined relationship requirement, the device may determine at 220 the adjusting pattern as zooming the camera to enable the total width and the second width to meet the predefined relationship requirement.

Alternatively or in addition, in some embodiments, if the device determines, at 210, that the first object overlaps with the second object and the ratio of the first region of the first object and the total region of the picture composition is less than the ratio threshold, the device may determine at 220 a direction for moving the camera to avoid overlapping between the first object and the second object. Then, the device may determine the adjusting pattern as moving the camera in the direction.

As a further alternative or in addition, in some embodiments, if the device determines, at 210, that the first center of the first object and the second center of the second object fail to meet the predefined position requirement, the device may determine at 220 a direction for moving the camera to enable the first center and the second center to meet the predefined position requirement. Then, the device may determine the adjusting pattern as moving the camera in the direction.

At 230, the adjusting pattern is provided to a user, to indicate the user to adjust the picture composition based on the adjusting pattern. The adjusting pattern may be implemented in a variety of ways, for example, an icon, a text prompt, a voice prompt, and/or other suitable prompt that can let the user know how to operate. Upon receipt of the adjusting pattern, the user may adjust the camera or the composition accordingly. In this way, it is possible to improve the picture composition, even if the user has poor photography skills.

Now some example embodiments of the present disclosure will be described with respect to FIGS. 3-6. In these embodiments, the first object is illustrated as a tree and the second object is illustrated as a boy. It is to be understood that the examples of the first object and the second object are just for illustration, rather than limitation. Those skilled in the art would appreciate that they can be implemented in many other suitable ways.

Figure 3:
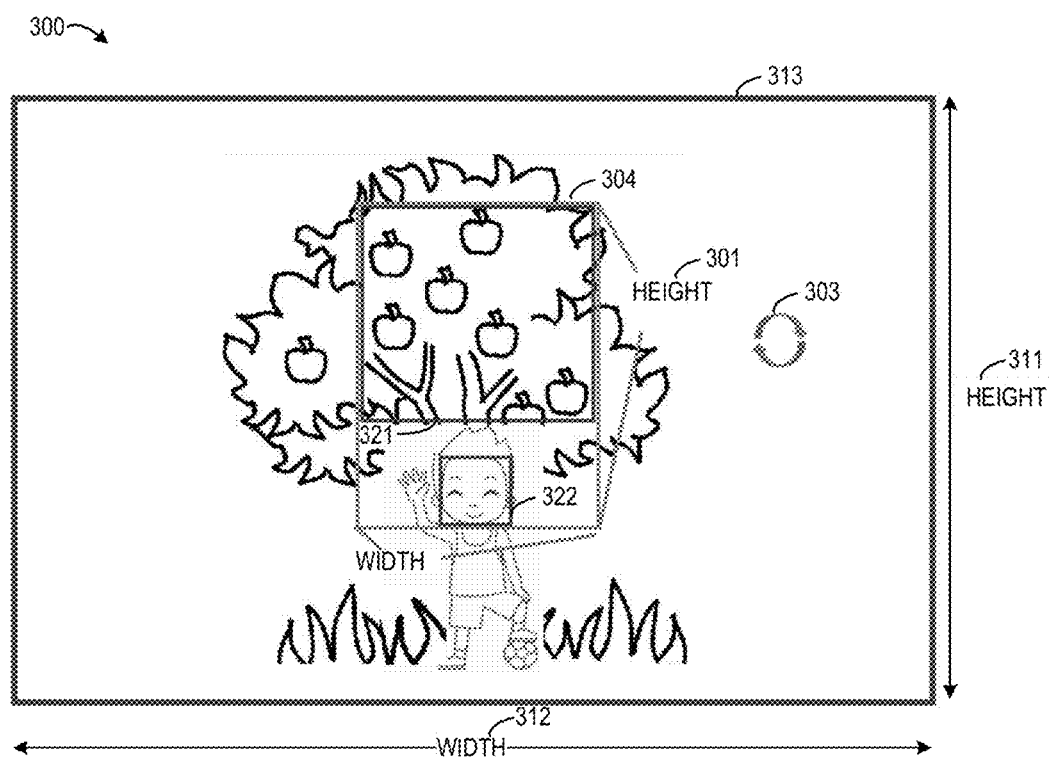
FIG. 3 is a schematic diagram of adjusting a picture composition in accordance with embodiments of the present disclosure.

FIG. 3 shows a schematic diagram of adjusting a picture composition in accordance with embodiments of the present disclosure. In this example, the first object is denoted by the main body 321 of the tree and the second object is denoted by the head 322 of the boy. The region including the first object and the second object is denoted by a rectangular 304, which has a height 301 and a width 302. Thus, the device may determine the first ratio based on the height 301 and the width 302, for example, through dividing the height 301 by the width 302, vice versa.

In the example of FIG. 3, the picture composition has a height 311 and a width 312. Thus, the device may determine the composition ratio based on the height 311 and the width 312 in a similar way. Then, the device may compare the composition ratio and the first ratio and determine whether they match. For instance, if both the composition ratio and the first ratio are larger than 1 or less than 1, the device may determine they match. Otherwise, if one of them is larger than 1 and the other is less than 1, the device may determine that the composition ratio mismatches the first ratio. In such a case, the device determines that the picture composition needs to be adjusted.

Referring to the example of FIG. 3, the device determines that the first ratio is larger than 1 and the composition ratio is less than 1, thus it determines that the picture composition needs to be adjusted. To matching the composition ration with the first ratio, the device may determine an adjusting pattern as rotating the camera to exchange the horizontal and vertical of the composition. The adjusting pattern may be provided to the user by means of an icon 303. Upon review of the icon, the user will understand that the camera needs to be rotated. After the rotation, the composition ratio can be larger than 1 and thus can match the first ratio. In this way, the picture taken by the user can better meet the predefined composition rule. It is to be understood that the above embodiments are described only for the purpose of illustration, without suggesting any limitations as to the scope of the disclosure. According to embodiments of the present disclosure, there are many other suitable ways for adjusting the picture composition.

Figure 4:
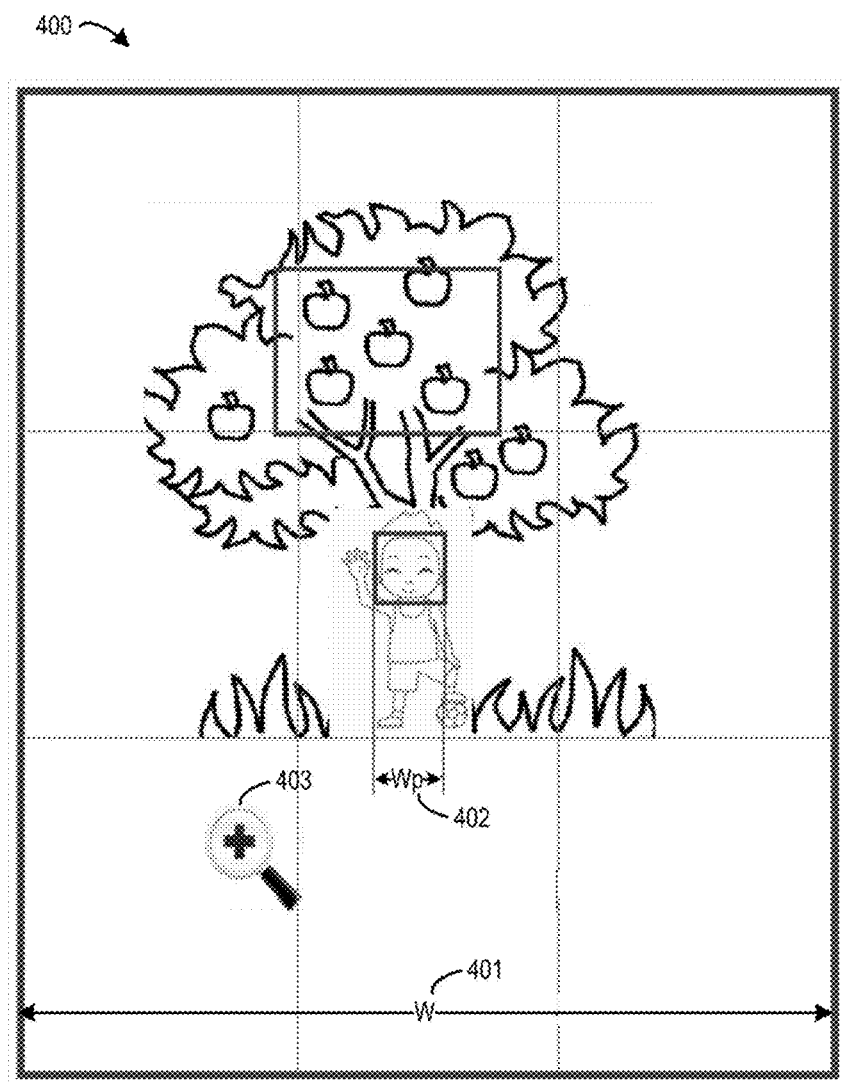
FIG. 4 is a schematic diagram of adjusting a picture composition in accordance with embodiments of the present disclosure.

FIG. 4 shows a schematic diagram of adjusting a picture composition in accordance with embodiments of the present disclosure. In this example, the device determines a total width W 401 of the picture composition and a second width Wp of the second object. Then, the device determines whether W and Wp meet a predefined relationship requirement, for example, Wp should be in the range of ⅕ to ⅓ of W. If second object includes a plurality of persons (denoting the number of the persons as n), the predefined relationship requirement may be defined as that the width of the second object in the picture should meet a requirement, such as within a range of n/(n+4) to n/(n+2) of the whole picture. In the example of FIG. 4, since the second object only includes one person, Wp should be in the range of ⅕ to ⅓ of W. If not, the device determines that the total width and the second width fail to meet the predefined relationship requirement, and thus determines that the picture composition needs to be adjusted.

To indicate the user to adjust the picture composition properly, the device may determine an adjusting pattern as zooming the camera to enable the total width and the second width to meet the predefined relationship requirement. In particular, if Wp>W*n/(n+2), the adjusting pattern may recommend the user to back away from the second object, for example, zooming out, until W*n/(n+4)≤Wp≤W*n/(n+2). In this case, the device may present an icon 403, for example, a minus sign "−", to inform the user to zoom the camera back away from the second object. On the other hand, if Wp<W*n/(n+4), the adjusting pattern may recommend the user to go forward to the second object, for example, zooming in, until W*n/(n+4)≤Wp≤W*n/(n+2). In this case, the device may present an icon 403, for example, a plus sign "+", to inform the user to zoom the camera to go forward to the second object.

Figure 5:
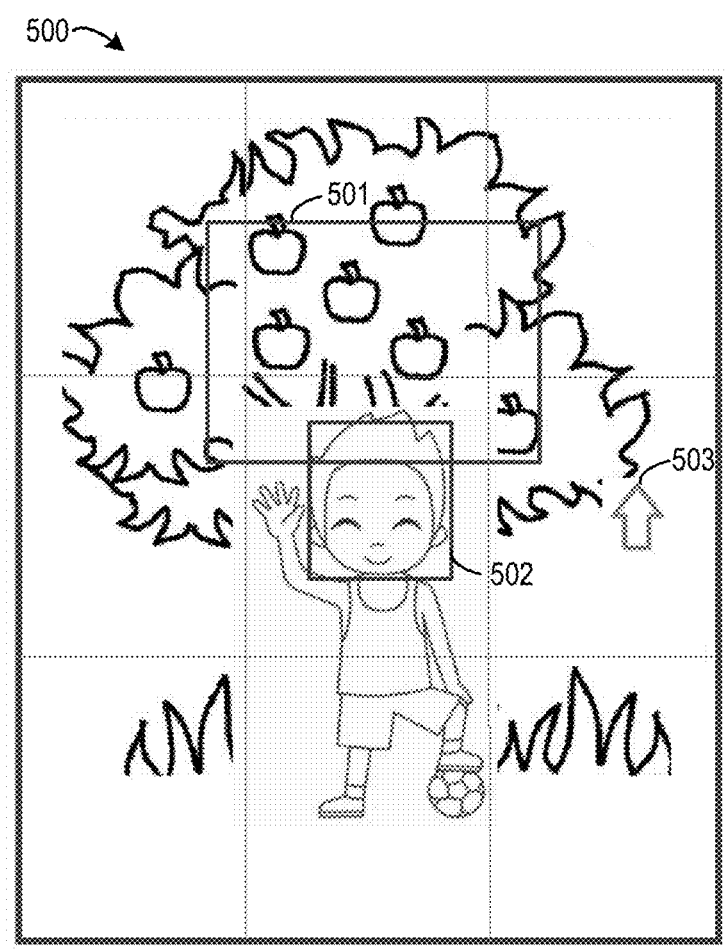
FIG. 5 is a schematic diagram of adjusting a picture composition in accordance with embodiments of the present disclosure.

FIG. 5 shows a schematic diagram of adjusting a picture composition in accordance with embodiments of the present disclosure. In this example, the first object is not allowed to overlap with the second object, unless areas of the first object and the whole picture meet a certain requirement. The device may determine whether the first object overlaps with the second object in several ways. In an embodiment, the device determines whether the rectangle 501 that covers the main body of the first object overlaps with the rectangle 502 that covers the head of the second object. If so, as shown in FIG. 5, the device may further determine whether a ratio of areas of a first region of the first object and a total region of the picture composition is less than a ratio threshold, for example, ⅔, wherein the first region and the total region represent the areas of the first object and the whole picture, respectively. In the example of FIG. 5, if the ratio is less than the ratio threshold, ⅔, the device may determine that the picture composition needs to be adjusted. In an embodiment, the device may determine an adjusting pattern to recommend the user, i.e., the photographer to move in order that the first object no longer overlaps with the second object. For instance, the user may move in a direction so that the rectangular 501 does not overlap with the rectangular 502 any longer. In the case that the second object includes a plurality of persons, the device may recommend the photographer to move in order that the first object no longer overlaps with any of the persons. In further embodiments, if the ratio is larger than the ratio threshold, ⅔, the device may allow the second object to cover the first object.

Figure 6:
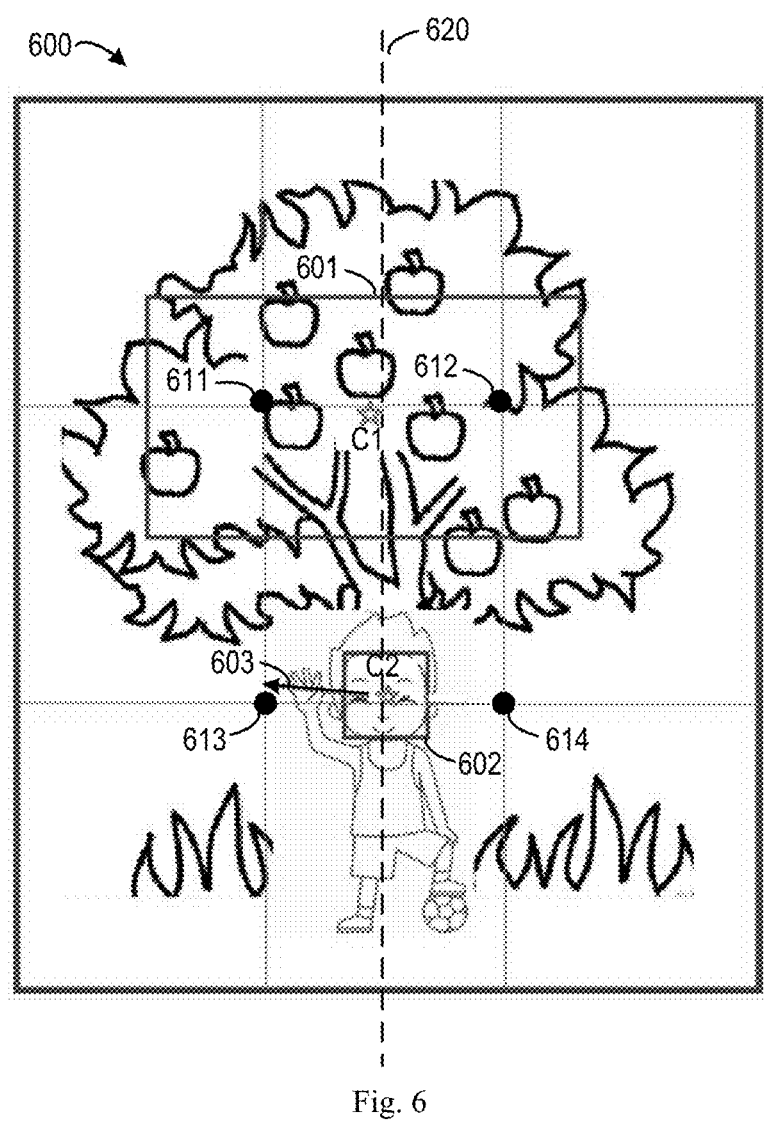
FIG. 6 is a schematic diagram of adjusting a picture composition in accordance with embodiments of the present disclosure.

FIG. 6 shows a schematic diagram of adjusting a picture composition in accordance with embodiments of the present disclosure. In this example, the device determines a center C1 (referred to as the "first center" hereafter) of the first object 601 and a center C2 (referred to as the "second center" hereafter) of the second object 602. Then, the device determines whether the first center C1 and the second center C2 meet a predefined position requirement. For example, if the picture composition is divided as nine rectangle grids, there may be four focuses 611, 612, 613 and 614. The predefined position requirement may require that the second center C2 should be in proximity of a focus. In this case, the device may select a focus from the focuses 611, 612, 613 and 614, for example, the nearest focus of the second center C2. Then, the device may determine a direction for moving the second center C2 to the nearest focus 613 in this example, and provide to the user an arrow 603 to present the direction. Upon review of the arrow 603, the user may understand that he/she should move the second center to the focus 613. In this way, the predefined position requirement can be met.

In addition or alternatively, in some embodiment, the predefined position requirement may require that if the picture composition is divided into two parts, the first center C1 and the second center C2 should not be in the same part. In the example of FIG. 6, it can be seen that the picture composition is divided by a dash line 620 into a left part and a right part, and both C1 and C2 are near the dash line 620. To meet the predefined position requirement, the device may determine a direction for moving the second center C2 to a focus (for example, the focus 613) in one part and the moving the first center C1 to a focus (for example, the focus 612) in the other part. In this way, the first and second centers can be placed in different parts of the picture composition and thus the composition can be improved.

It is to be understood that the above embodiments are discussed for example, rather than suggesting any limitation. Those skilled in the art would appreciate that there may be many other embodiments within the scope of the present disclosure. For example, some of the predefined composition rules may be combined, instead of being used alone, in the determination of whether the composition needs to be adjusted as well as the adjusting pattern.

In some embodiments, the device may determine weights for predefined composition rules, calculate a score for the predefined composition rules based on the weights, and then determine whether a picture composition of a first object and a second object needs to be adjusted based on the score. For instance, assuming there are M predefined composition rules (M≥1), the device may determine a score based on the M predefined composition rules to evaluate whether the picture composition needs to be adjusted. More specifically, the device may determine an initial score S0 for the composition of the picture to be taken (also referred to as the "initial composition") and a candidate score Sc for a candidate composition to which the initial composition may be adjusted. The scores may be calculated in several ways, for example, according to the following:

$$Sc = \sum_{i=1}^{M} Ri \times Wi. \quad (1)$$

where $Ri$ represents a result of whether the $i^{th}$ predefined composition rule is met, wherein $1 \leq i \leq M$. In an example, if the $i^{th}$ predefined composition rule is met, $Ri=1$; otherwise, $Ri=-1$.

Still referring to the equation (1), $Wi$ represents a weight defined for the $i^{th}$ predefined composition rule according to, for example, system requirements, historical values, user preferences or the like. In some embodiments, if the device has a special requirement on ratios of height and width of the composition and the objects, a rule associated with the ratios of height and width may have a higher weight than other rules. In some alternative embodiments, the device may look up to its historical data and rank the rules according to the frequencies they were been used. In this case, the rule having a higher frequency may have a higher weight. In some further alternative embodiments, the device may assign a higher weight for a rule preferred by the user, for example, the rule adopted by the user frequently.

It is to be understood that the above examples for determining the weights are described merely for the purpose of illustration, without suggesting any limitation as to the scope of the disclosure. Those skilled in the art will appreciate that there may be other suitable ways for determining the weights.

Table 1 shows an example of the weights $Wi$ and results $Ri$ of the M predefined composition rules, $1 \leq i \leq M$.

TABLE 1

| Rule | Weight (Wi) | Result (Ri) |
|---|---|---|
| 1 | 1/2 | 1, if the rule is met; −1, if not |
| 2 | 1/3 | 1, if the rule is met; −1, if not |
| 3 | 1/4 | 1, if the rule is met; −1, if not |
| 4 | 1/5 | 1, if the rule is met; −1, if not |
| 5 | 1/6 | 1, if the rule is met; −1, if not |
| ... | ... | ... |
| M | 1/(M + 1) | 1, if the rule is met; −1, if not |

In some embodiments, if the $Ri=-1$, the device may determine a set of predefined composition rules that can make $Ri=1$. More specifically, the device may determine, from the M predefined composition rules, a predefined composition rule j ($1 \leq j \leq M$) if it can be met when the predefined composition rule i is met. Then, the device may determine the predefined composition rule j as a member in the set of predefined composition rules that can make $Ri=1$. In this way, the set of predefined composition rules can be determined and can be used for calculating a candidate score Sc. If Sc>S0, the device may determine that the initial composition needs to be adjusted and determine the adjusting pattern based on the set of predefined composition rules.

Still referring to the embodiment of FIG. 6, more examples of the scoring will be discussed with respect to the predefined composition rules. In the examples, assuming there are 5 predefined composition rules (M=5), namely, Rule 1 to Rule 5. In addition, it is assumed that Rule 1 to Rule 5 define the following composition rules, respectively.

Rule 1: The composition ratio of the height and the width of the picture composition should match the first ratio of the height and the width of a region including the first object and the second object.

Rule 2: The total width W of the picture composition and the second width Wp of the second object should meet a predefined relationship requirement, for example, Wp should be in the range of $\frac{1}{5}$ to $\frac{1}{3}$ of W.

Rule 3: The first and second objects should not be covered by each other. If the first object is more than $\frac{2}{3}$ of the whole picture, allow the second object to cover the first object.

Rule 4: The center of the second object should be in the 4 focus of the nine-rectangle-grid.

Rule 5: The first object and the second object should not be in the same side of the picture.

In the examples shown in FIG. 6, initially, Rule 1 and Rule 2 are already applied while rules 3, 4, 5 are not. Thus, the initial score may be calculated as: $S0=\frac{1}{2}*1+\frac{1}{3}*1+\frac{1}{4}*(-1)+\frac{1}{5}*(-1)+\frac{1}{6}*(-1)=\frac{13}{60}$.

Then, the device may simulate scenarios where other rules are also applied and calculate corresponding candidate scores. First, for rule 3, the device may perform the following simulation action, that is, trying to move up the camera until the rectangle of the second object (i.e., the person in FIG. 6) and the rectangle of the first object (i.e., the scenery in FIG. 6) has no overlap anymore so that the person will not cover the scenery. In this case, rule 1 and rule 2 are still applied, rule 3 is applied, and rule 4 and 5 are not applied. The candidate score may be calculated as: $S1=\frac{1}{2}*1+\frac{1}{3}*1+\frac{1}{4}*1+\frac{1}{5}*(-1)+\frac{1}{6}*(-1)=\frac{43}{60}$. Since S1>S0, it can be determined that applying rules 1 to 3 is better than only applying rules 1 and 2.

In addition, as to rule 4, the device may perform the following simulation action, that is, moving the central point of the person to one focus of nine-rectangle-grid. The action should not reverse pervious actions. Thus, even there are 4 focuses, only the lower 2 focuses can be taken into consideration. That is to say, there are two options.

Option 1 (the right bottom focus)—applying rules 1, 2, 3 and 4, while rule 5 is not applied. In this case, the candidate score may be calculated as: $S2=\frac{1}{2}*1+\frac{1}{3}*1+\frac{1}{4}*1+\frac{1}{5}*1+\frac{1}{6}*(-1)=\frac{67}{60}$.

Option 2 (the left bottom focus)—applying all the rules 1, 2, 3, 4 and 5. In this case, the candidate score may be calculated as: $S3=\frac{1}{2}*1+\frac{1}{3}*1+\frac{1}{4}*1+\frac{1}{5}*1+\frac{1}{6}*1=\frac{87}{60}$.

It thus can be determined that S3>S2>S1>S0. So the final recommended action to end user is to move the camera towards right top until the central point of person gets to the left bottom focus of the nine-rectangle-grid.

It is to be understood that the above examples are described merely for the purpose of illustration, without suggesting any limitation as to the scope of the disclosure. Those skilled in the art will appreciate that there are many other suitable ways for calculating the scores.

The method 300 may be implemented by computer programs. For example, the computer programs, when executed by a processor on a device (such as the computer system 12 shown in FIG. 1, or one or more cloud computing nodes (not shown), may be loaded into the memory and cause the device to implement the method 300.

The present disclosure may be a method, a device, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an EPROM or Flash memory, a SRAM, a portable CD-ROM, a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored on a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    determining, based on a predefined composition rule, whether a picture composition of a first object and a second object needs to be adjusted; wherein the determining comprises:
        determining whether the first object overlaps with the second object;
        in response to determining that the first object overlaps with the second object, determining whether a ratio of areas of a first region of the first object and a total region of the picture composition is less than a ratio threshold; and
        in response to determining that the ratio is less than the ratio threshold, determining that the picture composition needs to be adjusted;
    in response to determining that the picture composition needs to be adjusted, determining an adjusting pattern based on the predefined composition rule; and
    providing the adjusting pattern to a user, to indicate the user to adjust the picture composition based on the adjusting pattern.

2. The method of claim 1, wherein the predefined composition rule is associated with a position relationship of the first object and the second object.

3. The method of claim 1, wherein determining the adjusting pattern comprises:
    determining a direction for moving the camera to avoid overlapping between the first object and the second object; and
    determining the adjusting pattern as moving the camera in the direction.

4. The method of claim 1, wherein the determining further comprises:
    determining a first center of the first object and a second center of the second object;
    determining whether the first center and the second center meet a predefined position requirement; and
    in response to determining that the first center and the second center fail to meet the predefined position requirement, determining that the picture composition needs to be adjusted.

5. The method of claim 4, wherein determining the adjusting pattern comprises:
    determining a direction for moving the camera to enable the first center and the second center to meet the predefined position requirement; and
    determining the adjusting pattern as moving the camera in the direction.

6. The method of claim 1, wherein the determining further comprises:
    determining a first ratio of a height and a width of a region including the first object and the second object;
    determining a composition ratio of a height and a width of the picture composition;
    determining whether the composition ratio matches the first ratio based on the predefined composition rule; and
    in response to determining that the composition ratio mismatches the first ratio, determining that the picture composition needs to be adjusted.

7. The method of claim 6, wherein determining the adjusting pattern comprises:
    determining the adjusting pattern as rotating the camera to enable the composition ratio to match the first ratio.

8. The method of claim 1, wherein the determining further comprises:
  determining a total width of the picture composition and a second width of the second object;
  determining whether the total width and the second width meet a predefined relationship requirement; and
  in response to determining that the total width and the second width fail to meet the predefined relationship requirement, determining that the picture composition needs to be adjusted.

9. The method of claim 8, wherein determining the adjusting pattern comprises:
  determining the adjusting pattern as zooming the camera to enable the total width and the second width to meet the predefined relationship requirement.

10. The method of claim 1, wherein the determining further comprises:
  determining weights for predefined composition rules;
  calculating a score for the predefined composition rules based on the weights; and
  determining whether a picture composition of a first object and a second object needs to be adjusted based on the score.

11. A device, comprising:
  one or more processors;
  a memory coupled to at least one of the processors;
  a set of computer program instructions stored in the memory and executed by at least one of the processors in order to perform actions including:
    determining, based on a predefined composition rule, whether a picture composition of a first object and a second object needs to be adjusted; wherein the determining comprises:
      determining whether the first object overlaps with the second object;
      in response to determining that the first object overlaps with the second object, determining whether a ratio of areas of a first region of the first object and a total region of the picture composition is less than a ratio threshold; and
      in response to determining that the ratio is less than the ratio threshold, determining that the picture composition needs to be adjusted;
    in response to determining that the picture composition needs to be adjusted, determining an adjusting pattern based on the predefined composition rule; and
    providing the adjusting pattern to a user, to indicate the user to adjust the picture composition based on the adjusting pattern.

12. The device of claim 11, wherein the predefined composition rule is associated with a position relationship of the first object and the second object.

13. The device of claim 11, wherein the actions further include:
  determining a first center of the first object and a second center of the second object;
  determining whether the first center and the second center meet a predefined position requirement; and
  in response to determining that the first center and the second center fail to meet the predefined position requirement, determining that the picture composition needs to be adjusted.

14. The device of claim 11, wherein the actions further include:
  determining a first ratio of a height and a width of a region including the first object and the second object;
  determining a composition ratio of a height and a width of the picture composition;
  determining whether the composition ratio matches the first ratio based on the predefined composition rule; and
  in response to determining that the composition ratio mismatches the first ratio, determining that the picture composition needs to be adjusted.

15. The device of claim 11, wherein the actions further include:
  determining a total width of the picture composition and a second width of the second object;
  determining whether the total width and the second width meet a predefined relationship requirement; and
  in response to determining that the total width and the second width fail to meet the predefined relationship requirement, determining that the picture composition needs to be adjusted.

16. The device of claim 11, wherein the actions further include:
  determining weights for predefined composition rules;
  calculating a score for the predefined composition rules based on the weights; and
  determining whether a picture composition of a first object and a second object needs to be adjusted based on the score.

17. A computer program product being tangibly stored on a non-transient machine-readable medium and comprising machine-executable instructions, the instructions, when executed by a device, causing the device to:
  determine, based on a predefined composition rule, whether a picture composition of a first object and a second object needs to be adjusted; wherein the determining comprises:
    determining whether the first object overlaps with the second object;
    in response to determining that the first object overlaps with the second object, determining whether a ratio of areas of a first region of the first object and a total region of the picture composition is less than a ratio threshold; and
    in response to determining that the ratio is less than the ratio threshold, determining that the picture composition needs to be adjusted;
  in response to determining that the picture composition needs to be adjusted, determine an adjusting pattern based on the predefined composition rule; and
  provide the adjusting pattern to a user, to indicate the user to adjust the picture composition based on the adjusting pattern.

18. The computer program product of claim 17, wherein the predefined composition rule is associated with a position relationship of the first object and the second object.

* * * * *